(12) United States Patent
Koishi

(10) Patent No.: US 8,502,881 B2
(45) Date of Patent: Aug. 6, 2013

(54) IMAGE PROCESSING APPARATUS, IMAGE PROCESSING METHOD, AND ELECTRONIC CAMERA

(75) Inventor: Erika Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 271 days.

(21) Appl. No.: 12/824,756

(22) Filed: Jun. 28, 2010

(65) Prior Publication Data

US 2011/0001843 A1    Jan. 6, 2011

(30) Foreign Application Priority Data

Jul. 1, 2009   (JP) ................................ 2009-156880

(51) Int. Cl.
*H04N 9/73* (2006.01)
*G06K 9/00* (2006.01)

(52) U.S. Cl.
USPC ........................................ 348/223.1; 382/167

(58) Field of Classification Search
USPC ............... 348/223.1–225.1, 207.1; 382/167
See application file for complete search history.

(56) References Cited

U.S. PATENT DOCUMENTS

| | | | |
|---|---|---|---|
| 6,542,634 B1 | 4/2003 | Ohga | |
| 6,980,231 B1 * | 12/2005 | Ohsawa | 348/188 |
| 7,020,331 B2 * | 3/2006 | Saikawa et al. | 382/167 |
| 8,013,903 B2 * | 9/2011 | Ohga | 348/222.1 |
| 2004/0135889 A1 * | 7/2004 | Koizumi et al. | 348/207.1 |
| 2005/0212914 A1 * | 9/2005 | Seto et al. | 348/207.1 |
| 2008/0240605 A1 * | 10/2008 | Enjuji | 382/274 |
| 2009/0027515 A1 * | 1/2009 | Maruyama et al. | 348/223.1 |
| 2009/0147098 A1 * | 6/2009 | Li | 348/223.1 |
| 2009/0180000 A1 * | 7/2009 | Shiraishi | 348/223.1 |

FOREIGN PATENT DOCUMENTS

| | | |
|---|---|---|
| JP | A-07-222196 | 8/1995 |
| JP | A-2000-50086 | 2/2000 |
| JP | A-2005-209012 | 8/2005 |
| JP | A-2007-200069 | 8/2007 |
| JP | A-2008-269305 | 11/2008 |
| JP | A-2009-078565 | 4/2009 |

OTHER PUBLICATIONS

Apr. 16, 2013 Office Action issued in Japanese Patent Application No. 2009-156880 (with translation).

* cited by examiner

*Primary Examiner* — Sinh Tran
*Assistant Examiner* — Christopher K Peterson
(74) *Attorney, Agent, or Firm* — Oliff & Berridge, PLC

(57) ABSTRACT

An image processing apparatus comprising: an input visual environment acquisition unit that acquires a shooting scene viewing condition at the time of shooting an image, an output visual environment acquisition unit that acquires a shot image viewing condition, a converting unit that converts the image using a predetermined color appearance model based on the shooting scene viewing condition acquired by the input visual environment acquisition unit and the shot image viewing condition acquired by the output visual environment acquisition unit, and a correction unit that corrects a parameter of the color appearance model used by the converting unit by using at least one of a shooting condition of the image and a scene judging result based on at least one of the image and the shooting conditions of the image.

12 Claims, 3 Drawing Sheets

| INPUT VISUAL ENVIRONMENT AMBIENT LIGHTING | AVERAGE LIGHTING | DIM | DARK | AVERAGE LIGHTING | AVERAGE LIGHTING | DIM | DARK | DIM | DARK |
|---|---|---|---|---|---|---|---|---|---|
| OUTPUT VISUAL ENVIRONMENT AMBIENT LIGHTING | AVERAGE LIGHTING | DIM | DARK | DARK | DIM | DARK | DIM | AVERAGE LIGHTING | AVERAGE LIGHTING |
| TONE CORRECTION CURVE | C | C | C | A | B | B | D | D | E |

IMAGE PROCESSING APPARATUS, IMAGE PROCESSING METHOD, AND ELECTRONIC CAMERA

CROSS-REFERENCE TO RELATED APPLICATION

The disclosure of the following priority application is herein incorporated by reference:
Japanese Patent Application No. 2009-156880 filed on Jul. 1, 2009.

TECHNICAL FIELD

The present invention relates to an image processing apparatus, an image processing method, and an electronic camera.

BACKGROUND ART

When the white point or the luminance of the lighting, the ambient lighting, and other such factors of the so-called visual environment differ, the appearance of the color differs. As color matching technology for reproducing the appearance of color even under different visual environments (viewing conditions of scene or image), for example, the one described in the following Patent Literature 1 is known.

CITATION LIST

Patent Literature

Patent Literature 1: Japanese Patent Laid-open Publication No. 2000-50086-A

SUMMARY OF INVENTION

Technical Problem

When a person focuses on something, as with the saying a "narrowed focus", the surroundings tend to fade. For this reason, even when shooting the same scene, a photographer has a different visual sense when focusing on a main object (person) such as in the portrait mode and when shooting while viewing the broader surroundings such as with landscape photographs.

However, with the conventional color matching techniques, it was not possible to reproduce the intent of the photographer when actually taking the shot (the visual sense of the photographer).

The present invention was made in consideration of such a point and has as its object to provide an image processing apparatus, an image processing method, and an electronic camera able to reproduce the sense of the photographer when actually viewing an image at the time of taking a shot in the appearance of the image.

Solution to Problem

An image processing apparatus according to a first aspect of the present invention comprises an input visual environment acquisition unit that acquires a shooting scene viewing condition at the time of shooting an image, an output visual environment acquisition unit that acquires a shot image viewing condition, a converting unit that converts the image using a predetermined color appearance model based on the shooting scene viewing condition acquired by the input visual environment acquisition unit and the shot image viewing condition acquired by the output visual environment acquisition unit, and a correction unit that corrects a parameter of the color appearance model used by the converting unit by using at least one of a shooting condition of the image and a scene judging result based on at least one of the image and the shooting conditions of the image.

An image processing apparatus according to a second aspect of the present invention comprises an input visual environment acquisition unit that acquires a shooting scene viewing conditions at the time of shooting an image, an output visual environment acquisition unit that acquires a shot image viewing condition, a converting unit that converts the image using a predetermined color appearance model based on the shooting scene viewing condition acquired by the input visual environment acquisition unit and the shot image viewing condition acquired by the output visual environment acquisition unit, and a selecting unit that selects a tone conversion characteristic used by the converting unit for tone conversion by using at least one of a shooting condition of the image and a scene judging result based on at least one of the image and the shooting condition of the image.

An image processing method according to a third aspect of the present invention comprises an input visual environment acquisition step that acquires a shooting scene viewing condition at the time of shooting an image, an output visual environment acquisition step that acquires a shot image viewing condition, a converting step that converts the image using a predetermined color appearance model based on the shooting scene viewing condition acquired by the input visual environment acquisition step and the shot image viewing condition acquired by the output visual environment acquisition step, and a correction step that corrects a parameter of the color appearance model used by the converting step by using at least one of a shooting condition of the image and a scene judging result based on at least one of the image and the shooting condition of the image.

An image processing method according to a fourth aspect of the present invention comprises an input visual environment acquisition step that acquires a shooting scene viewing conditions at the time of shooting an image, an output visual environment acquisition step that acquires a shot image viewing condition, a converting step that converts the image using a predetermined color appearance model based on the shooting scene viewing condition acquired by the input visual environment acquisition step and the shot image viewing condition acquired by the output visual environment acquisition step, and a selecting step that selects a tone conversion characteristic used by the converting step for tone conversion by using at least one of a shooting condition of the image and a scene judging result based on at least one of the image and the shooting condition of the image.

An electronic camera according to a fifth aspect of the present invention comprises an imaging device and the image processing apparatus according to the first aspect of the present invention.

An electronic camera according to a sixth aspect of the present invention comprises an imaging device and the image processing apparatus according to the second aspect of the present invention.

Advantageous Effects of Invention

According to the present invention, there is the advantageous effect that it is possible to reproduce the actual visual sense of a photographer when shooting an image in the appearance of the image.

DESCRIPTION OF EMBODIMENTS

Figure 1:
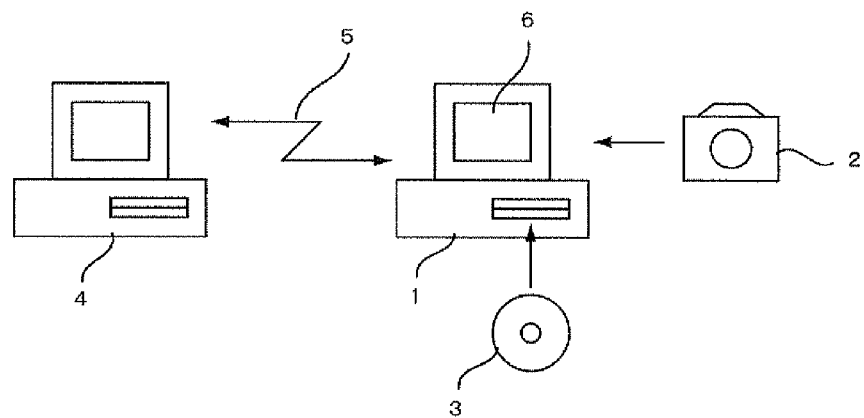
FIG. 1 is a view showing the schematic configuration of a computer system of an embodiment of the present invention.

Below, an embodiment of the present invention will be explained in detail with reference to the drawings. As shown in FIG. 1, an image processing apparatus of the present embodiment is realized by a personal computer 1. The personal computer 1 is connected to a digital camera 2, a computer-readable storage medium such as a CD-ROM and a SD card, another computer 4, etc. and receives various types of image data from the same. The personal computer 1 processes the provided image data by image processing (conversion processing) for reproducing the appearance of color when viewing the image under different visual environments. The computer 4 is connected to the computer 1 through the Internet or another telecommunication line 5.

The image processing program run by the personal computer 1 for the image processing is provided by a computer-readable storage medium 3 such as a CD-ROM or through the Internet or other telecommunication line 5 from the another computer 4 etc. and installed into the personal computer 1. The personal computer 1 is provided with a CPU (not shown), a memory (not shown), peripheral circuits (not shown), a monitor (display device) 6, etc. The CPU runs the installed program. Note that the image processing apparatus of this embodiment may not only be realized by the cooperative action of software and the hardware resources of the computer system in this way, but may also be realized in part or whole as hardware using electronic circuits. Further, the image processing apparatus of the present embodiment is realized here using a personal computer, but may also be equipped with an electronic camera comprising an imaging device (CCD, CMOS, etc.), an imaging lens, etc.

Figure 2:
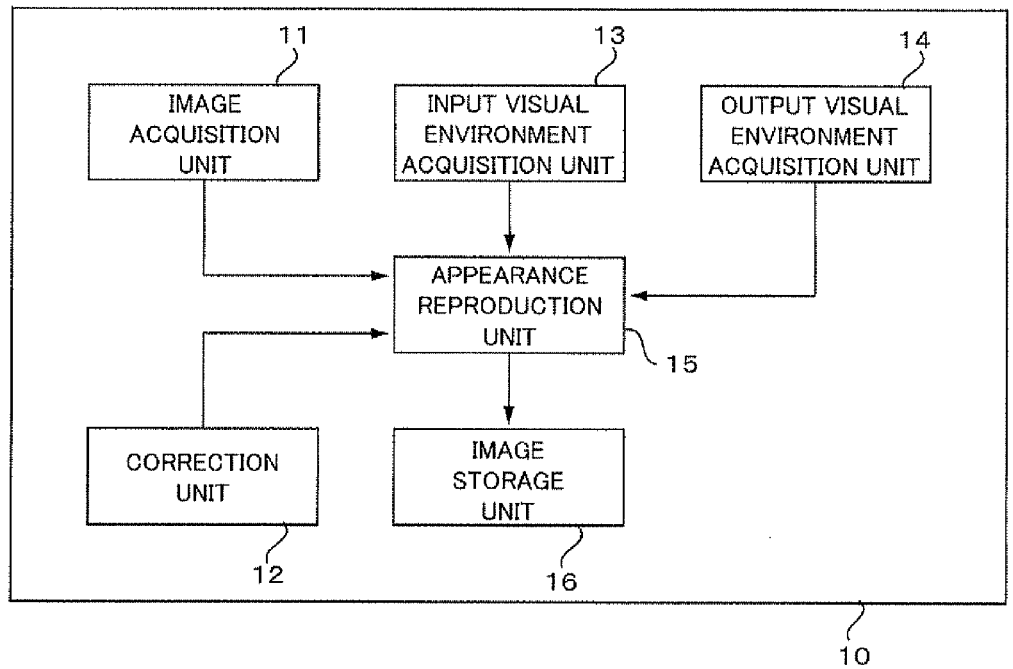
FIG. 2 is a block diagram showing the functional configuration of an image processing apparatus of an embodiment of the present invention.

The functional configuration of the image processing apparatus 10 realized by the personal computer 1 is shown in FIG. 2. The image processing apparatus 10 comprises an image acquisition unit 11 that acquires a shot image, an input visual environment acquisition unit 13 that acquires shooting scene viewing conditions at the time of shooting the shot image, an output visual environment acquisition unit 14 that acquires scheduled image viewing conditions for viewing the shot image, an appearance reproduction unit (converting unit) 15 that converts the shot image using a predetermined color appearance model based on the shooting scene viewing conditions acquired by the input visual environment acquisition unit 13 and the image viewing conditions acquired by the output visual environment acquisition unit 14, a correction unit 12 that corrects parameters of the color appearance model used by the appearance reproduction unit 15 by using at least one of the shooting conditions when shooting the shot image and the scene judging results based on the shot image or the shooting conditions, and an image storage unit 16 that stores the image converted by the appearance reproduction unit 15. Note that, below, the "shooting scene viewing conditions (conditions for viewing the shooting scene)" or the "image viewing conditions (conditions for viewing the image)" will be referred to as the "visual environment".

The image processing apparatus 10 of the present embodiment is an apparatus generating the image data obtained by converting the image data shot on the visual environment at the time of shooting (lighting conditions of the shooting scene), considering human visual perception characteristics, so that the appearance of the color of the image is reproduced in the visual environment at the time of viewing different from the visual environment at the time of shooting (for example, display device 6 of personal computer 1 or photograph printed using a printer). Below, the flow of the processing by this image processing apparatus 10 will be explained in detail using FIG. 3.

(Acquisition of Input Image S1)

This image processing is started by the user performing an operation on the personal computer 1 to start this image processing. When the processing is started, first, the image data to be processed is acquired by the image acquisition unit 11 (step S1). The image acquiring processing by the image acquisition unit 11 is processing for acquiring an image in accordance with an operation by the user, for example, reading image data relating to a file name designated by the user from the storage medium 3 etc. Note that, the image data acquired here includes the exposure value, aperture value, white balance value, focal distance, object distance, and other shooting conditions at the time of shooting added as additional information.

(Acquisition of Input Visual Environment S2)

Next, the input visual environment acquisition unit 13 is used to acquire, as the input visual environment, the visual environment of the shooting scene (step S2). This input visual environment includes, as parameters, the lighting white point on the shooting scene $(X_W, Y_W, Z_W)$, lighting luminance $Y_{W0}$, and ambient luminance $Y_{SW0}$. The lighting white point $(X_W, Y_W, Z_W)$ and the lighting luminance $Y_{W0}$ may, for example, be acquired by having the photographer make measurements using a spectral radiance meter or other ambient light sensor when shooting the image and input the measurement results using a keyboard etc. attached to the personal computer 1 and later reading out these values. Note that, regarding the lighting white point $(X_W, Y_W, Z_W)$ at the time of shooting, a value obtained by calculation using an auto white balance function provided in an electronic camera shooting the shot image in question may be used, while regarding the lighting luminance $Y_{W0}$ at the time of shooting, the value obtained by calculation analyzing the results of the light measurement function used for auto adjustment of the exposure may be used.

For the ambient luminance $Y_{SW0}$, the value calculated using the results of measurement of the light while widening the measurement range in the electronic camera may be used or additional information input by the user in advance and added to the image data or a value input at the personal computer 1 from the keyboard etc. may be used. Further, as the ambient luminance $Y_{SW0}$, for example, "outside lighting in daytime", "indoor lighting", "dark", or other several options may be provided in advance and the user may select and designate the close conditions from among these using the keyboard etc. and use the average value for the selected results. Note that, as the input visual environment, these lighting white point, lighting luminance, ambient luminance, and also the white points of the surroundings or other parameters may also be included.

(Acquisition of Output Visual Environment and Output Color Space S3)

Next, the output visual environment acquisition unit 14 acquires the output visual environment and output color space (step S3). This output visual environment is the visual environment information for when viewing the image by a predetermined display means (personal computer display device, electronic photo album, printed photograph, etc.) The output visual environment includes as parameters the lighting white point ($X_W'$, $Y_W'$, $Z_W'$) and device luminance (lighting luminance) $Y_{W0}'$ of the display means and the ambient luminance $Y_{SW0}'$. Note that, in addition to these lighting white point, device luminance (lighting luminance), and ambient luminance, the ambient white point and other parameters may also be included. The values of these parameters may be acquired by reading values input and set by the user at the computer system 1 using the keyboard etc.

Further, for the output visual environment, for example, "standard visual environment of printing", "visual environment in case of observation of printing under light bulb illumination", "standard visual environment of display", "television display", back side liquid crystal display of camera", or several other options are provided in advance. The user selects the close conditions from among these and sets the general visual environment or standard visual environment for the selected result as the output visual environment. For example, when viewing by the standard visual environment of the display, the sRGB standard visual environment includes a white point=D65, luminance $Y_{device0}'$=80 Cd/m², and ambient luminance $Y_{SW0}'$=4.1 Cd/m². When the user uses the keyboard etc. to input the white point ($X_{device}'$, $Y_{device}'$, $Z_{device}'$) and luminance $Y_{device0}'$ of the device used for image viewing and the ambient lighting white point ($X_{SW}'$, $Y_{SW}'$, $Z_{SW}'$) and ambient lighting luminance $Y_{SW0}'$, the lighting white point ($X_W'$, $Y_W'$, $Z_W'$) and luminance $Y_{W0}'$ in the image viewing visual environment are determined as a mixture of the device white point and the ambient lighting white point.

Further, for the output color space, sRGB, CMYK, and several other options are provided in advance. The one selected and designated by the user from among these is obtained.

(Determination of Ambient Lighting Condition of Input Visual Environment S4)

Next, at step S4, the ambient lighting condition of the input visual environment is determined as one of the parameters of the color appearance model used in the later explained appearance reproduction processing (step S8). This processing is part of the processing by the appearance reproduction unit 15. In this processing, the ambient lighting Sr in the visual environment of the scene, defined by CIECAM02, is found. That is, Sr is calculated as the ratio ($Y_{SW0}/Y_{W0}$) of the lighting luminance and ambient luminance, and, for example, the ambient lighting condition ("average lighting", "dim", or "dark") in the visual environment of the scene is determined in accordance with the following predetermined conditions.

When Sr>0.2: average lighting
When 0<Sr≦0.2: dim
Sr=0: dark (Calculation of Depth of Field S5)

Next, the depth of field is calculated (step S5). The depth of field d is calculated using the shooting conditions by the following formula (1). Note that, this step S5 and the later explained step S6 and step S7 are processing performed by the correction unit 12.

$$d = \frac{2 \cdot f^2 \cdot s^2 \cdot \varepsilon \cdot F}{f^4 - (s \cdot \varepsilon \cdot F)^2} \quad (1)$$

where,
F: F number
f: focal distance
$\varepsilon$: permissible circle of confusion
s: object distance These shooting conditions (F, f, $\varepsilon$, s) are values set in the additional information added to the image data or values calculated based on the set values. Note that, the "permissible circle of confusion $\varepsilon$" is a value determined in advance in accordance with the pixel size of the imaging device equipped in the electronic camera 2.

(Calculation of Angle of View S6)

Next, the angle of view is calculated from the focal distance f as the shooting condition.

(Judgment of Intent of Photographer and Correction of Ambient Lighting Condition of Input Visual Environment S7)

Next, the depth of field and angle of view determined at step S5 and S6 are used to judge the intent of the photographer when shooting the shot image (whether the photographer is focusing on a person or other main object) in accordance with predetermined conditions. When the predetermined conditions are satisfied, the ambient lighting condition of the input visual environment is corrected to the ambient lighting condition actually intended by the photographer. That is, when the depth of field is shallow or when the angle of view is narrow, it is deduced that the photographer is focusing on a person or other main object, so the ambient lighting condition of the input visual environment determined at step S4 is corrected to a one-level darker condition. For example, when the depth of field is shallow (d≦1 m), if the ambient lighting condition of the input visual environment determined at step S4 is "average lighting", it is corrected to "dim", if when the ambient lighting condition of the input visual environment determined at step S4 is "dim", it is corrected to "dark".

Even when the depth of field is deeper than the above (1 m<d≦5 m) and even when the angle of view is small (angle of view <45°), it is deduced that the photographer is focusing on a main object. When the ambient lighting condition of the input visual environment determined at step S4 is the "average lighting", it is corrected to "dim", while when the ambient lighting condition of the input visual environment determined at step S4 is "dim", it is corrected to "dark". In other cases, it is deduced that the photographer is not focusing on a main object (is viewing landscape etc. as a whole), so the ambient lighting condition is not corrected. The ambient lighting condition of the input visual environment determined at step S4 is used as is.

(Appearance Reproduction Processing S8)

Next, the appearance reproduction unit 15 executes the appearance reproduction processing based on the shot image acquired by the image acquisition unit 11, the input visual environment acquired by the input visual environment acquisition unit 13 (when the ambient lighting condition is corrected by the correction unit 12, the corrected visual environment), and the output visual environment acquired by the output visual environment acquisition unit 14 (step S8). This appearance reproduction processing is processing for preparing an output image converted so that the appearance of the image when viewed by the input visual environment (visual environment of scene) is reproduced when viewing it by the scheduled output visual environment for viewing the image (display device of personal computer, printed photograph, etc.)

In the appearance reproduction processing, the appearance of the CIECAM02 (CIE Colour Appearance Model 2002) or another color model is used to convert the shot image to an output image. Here, as one example, to lighten the processing load of the personal computer 1, processing for reproduction using the appearance of a simplified color model simpler than CIECAM02 will be explained. However, the appearance of the color model used in the appearance reproduction processing is not limited to such a simplified model.

First, the shot image is described by a color space dependent on the device (camera RGB space of imaging device), so is converted to a color space not dependent on the device, that, is, the CIE 1931 XYZ color space. The RGB color space is converted to the XYZ color space using for example a matrix $M_{RGB\text{-}XYZ}$ such as the following formula (2):

$$\begin{pmatrix} X \\ Y \\ Z \end{pmatrix} = M_{RGB \to XYZ} \cdot \begin{pmatrix} R \\ G \\ B \end{pmatrix} \quad (2)$$

Next, color adaptation conversion is performed from the input visual environment to the output visual environment. In this color adaptation conversion, first, the adaptation factors D, D' showing the degree of adaptation with respect to the visual environments are calculated from the lighting luminance and the ambient lighting at the visual environments using the following formula (3) and formula (4).

$$D = F\left[1 - \left(\frac{1}{3,6}\right)e^{\left(\frac{-(L_A + 42)}{92}\right)}\right] \quad (3)$$

$$D' = F\left[-\left(\frac{1}{3,6}\right)e^{\left(\frac{-(L'_A + 42)}{92}\right)}\right] \quad (4)$$

Here, $L_A$ and $L_A'$ are the adaptation luminances, that is, the luminances adapted at the input visual environment and output visual environment. As these adaptation luminances $L_A$ and $L_A'$, usually one-fifth of the lighting luminance is used. Further, F and F' are parameters determined in accordance with the ratios of the lighting luminance and ambient luminance at the input visual environment and output visual environment. As the ambient lighting condition of the input visual environment at this time, when correction is performed at step S7, the condition after correction is used. When correction is not performed at step S7, the condition based on the input visual environment determined at step S4 is used.

Next, the XYZ color space is converted to a cone response LMS color space using the matrix $M_{CAT02}$. The lighting white point $(X_W, Y_W, Z_W)$, $(X_W', Y_W', Z_W')$ and adaptation factors D, D' in the input visual environment and output visual environment at the LMS color space are used for color adaptation conversion using a Von Kries color adaptation prediction formula to convert the LMS color space to the XYZ color space. Next, the XYZ color space is converted to the output color space R'G'B' obtained at step S3. That is, color conversion such as shown in the following formula (5) is performed on each pixel.

$$\begin{pmatrix} R' \\ G' \\ B' \end{pmatrix} = (M_{R'G'B' \to XYZ})^{-1} \cdot (M_{CAT02})^{-1} \cdot M \cdot M_{CAT02} \cdot M_{RGB \to XYZ} \cdot \begin{pmatrix} R \\ G \\ B \end{pmatrix} \quad (5)$$

However, $$M = \begin{pmatrix} L'_{W,D}/L_{W,D} & 0,0 & 0.0 \\ 0.0 & M'_{W,D}/M_{W,D} & 0.0 \\ 0.0 & 0.0 & S'_{W,D}/S_{W,D} \end{pmatrix}$$

$$\begin{pmatrix} L_W \\ M_W \\ S_W \end{pmatrix} = M_{CAT02} \cdot \begin{pmatrix} X_W \\ Y_W \\ Z_W \end{pmatrix}$$

$$\begin{pmatrix} L'_W \\ M'_W \\ S'_W \end{pmatrix} = M_{CAT02} \cdot \begin{pmatrix} X'_W \\ Y'_W \\ Z'_W \end{pmatrix}$$

$$L_{W,D} = \frac{L_W}{Y_W \cdot D + L_W \cdot (1 - D)}$$

$$M_{W,D} = \frac{M_W}{Y_W \cdot D + M_W \cdot (1 - D)}$$

$$S_{W,D} = \frac{S_W}{Y_W \cdot D + S_W \cdot (1 - D)}$$

$$L'_{W,D} = \frac{L'_W}{Y'_W \cdot D' + L'_W \cdot (1 - D')}$$

$$M'_{W,D} = \frac{M'_W}{Y'_W \cdot D' + M'_W \cdot (1 - D')}$$

$$S'_{W,D} = \frac{S'_W}{Y'_W \cdot D' + S'_W \cdot (1 - D')}$$

After this, the tone is converted in accordance with the tone characteristic of the output color space. In this tone conversion, first, gamma correction is performed in accordance with the output color space. For example, if the sRGB color space is selected as the output color space, an about 2.2 power gamma value is applied. Next, in accordance with the combination of the input visual environment and the ambient lighting of the output visual environment (ratio of lighting luminance and ambient luminance), the tone correction curve is selected and the tone corrected using FIG. 4. As the ambient lighting condition of the input visual environment at this time, when corrected at step S7, the condition after correction is used. When not corrected at step S7, the ambient lighting condition of the input visual environment determined at step S4 is used. Note that it is also possible to prepare in advance tone curves combining the tone correction curves and the tone characteristics of the output color space and use these.

The tone is corrected as follows. The ambient lighting of the output visual environment also, like the above-mentioned ambient lighting of the input visual environment, can be roughly classified into three types ("average lighting", "dim", and "dark"), so based on the ambient luminance/lighting luminance ($Y_{SW0}'/Y_{WO}'$), this is judged in the same way as the above-mentioned judgment of the ambient lighting condition of the input visual environment (step S4) to determine the ambient lighting condition of the output visual environment. Next, the type of the tone correction curve ("A" to "E") corresponding to the combination of the ambient lighting condition of the input visual environment (when corrected at step S7, the ambient lighting conditions after correction) and the ambient lighting condition of the output visual environment is specified in accordance with FIG. 4.

Figures 4, 5:
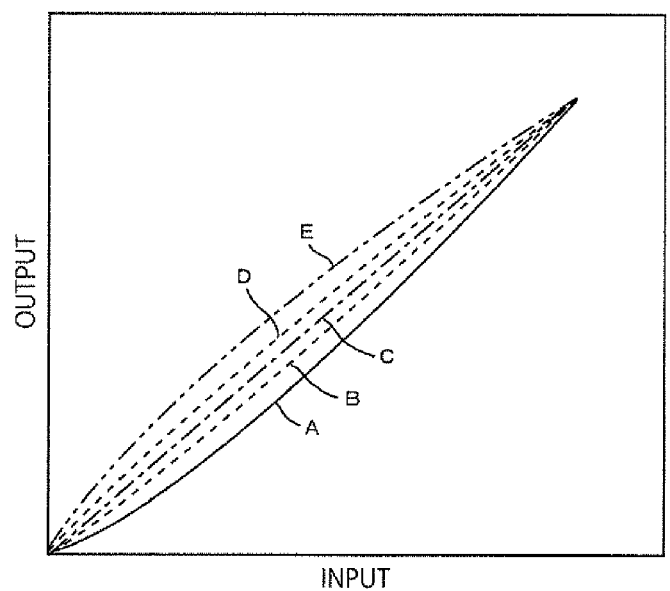
FIG. 4 is a view showing the correspondence of the combinations of ambient lighting conditions of an input visual environment and ambient lighting conditions of an output visual environment and a tone correction curves in the image processing apparatus of an embodiment of the present invention.
FIG. 5 is a view showing an example of a tone correction curves used in an embodiment of the present invention.

For example, when the ambient lighting of the input visual environment is "average lighting", this is corrected to make it "dim", when the ambient lighting of the output visual environment is "average lighting", the tone correction curve "D" is selected, when the ambient lighting of the input visual environment is "dim", this is corrected to make it "dark", and when the ambient lighting of the output visual environment is "dark", the tone correction curve "C" is selected. As the tone correction curves "A" to "E", for example, the curves as shown in FIG. 5 are set in advance. The corresponding curves are used for correction of the tone.

(Storage of Output Image S9)

At step S8, the appearance reproduction processing is ended and the output image (converted image) output from the appearance reproduction unit 15 is stored by the image storage unit 16 as an image file in a memory (hard disk drive etc.) or the storage medium 3 provided in the personal computer 1 (step S9). After this storage processing, the series of processing is ended.

According to the present embodiment, under shooting conditions focusing on the main object such as when taking a portrait or closeup (macroshot), the depth of field is shallow, so the image is corrected to make ambient lighting condition of the input visual environment one level darker. Therefore, it is possible to obtain a reproduced image corrected in tone to make it brighter than actuality and reflecting the intent of the photographer. On the other hand, when shooting an image while making the depth of field deep such as when shooting a landscape, the ambient lighting condition determined at the input visual environment is used as it is, so an image is reproduced close to the actually viewed impression or photographer's intent.

Figure 3:
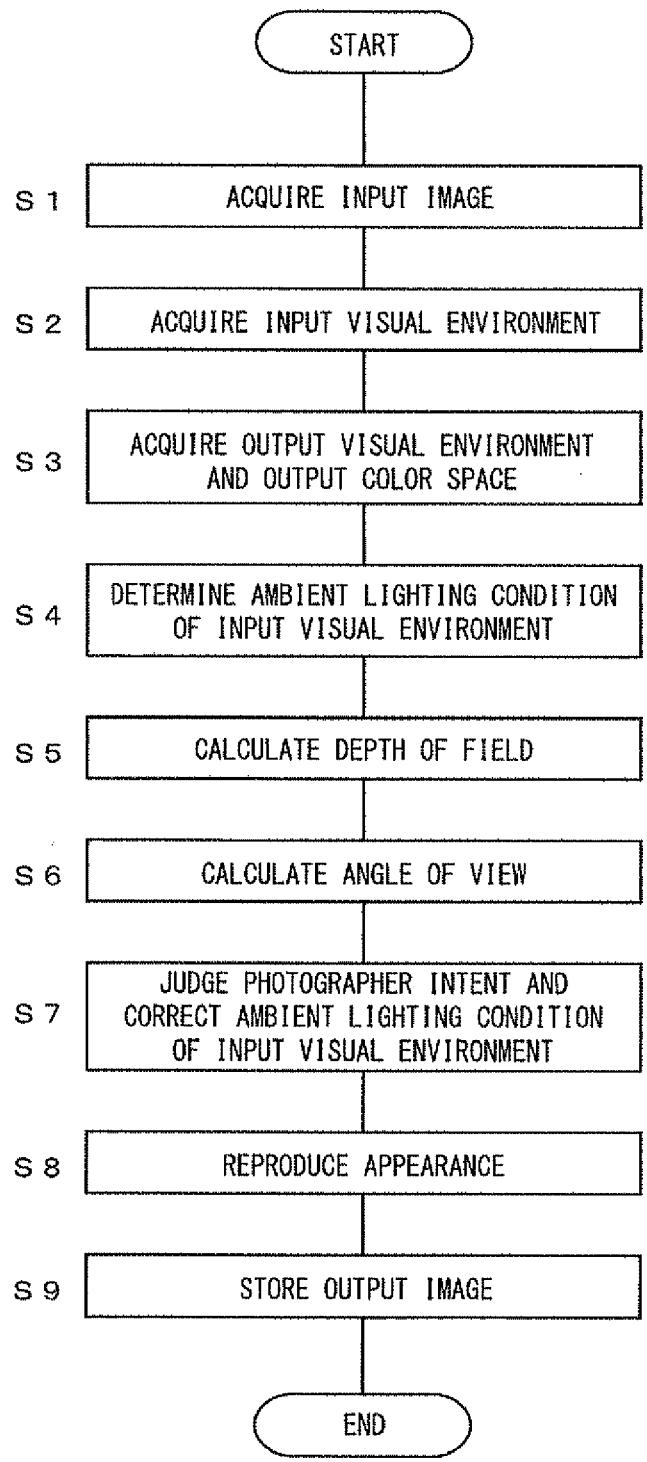
FIG. 3 is a flow chart of processing by the image processing apparatus of an embodiment of the present invention.

Note that, the above-mentioned embodiment calculates the depth of field at step S5 of FIG. 3, calculates the angle of view at step S6, and uses both of these depth of field and angle of view to judge whether to correct the ambient lighting condition of the input visual environment at step S7, but it is also possible to use just one of the depth of field and angle of view for the judgment.

Further, when the shooting scene mode (portrait, closeup, landscape, etc.) is set for the shooting conditions set as the additional information of the image data, it is also possible to perform the judgment at step S7 in accordance with this shooting scene mode. In this case, when the shooting scene mode is "portrait" or "closeup", it can be deduced that the photographer focused on the main object, so the ambient lighting condition of the input visual environment is corrected, while when the shooting mode is "landscape", it can be deduced that the photographer is not focusing on the main object (is viewing the whole), so the ambient lighting condition of the input visual environment is not corrected. This judgment in accordance with the shooting scene mode may be performed in addition to the above judgment by the depth of field and/or angle of view or may be performed alone.

Furthermore, in the judgment processing performed at step S7, in the above explanation, the processing was performed based on the shooting conditions, but it is also possible to judge the scene using not the shooting conditions, but known facial recognition processing or other image analysis processing based on the shot image or shooting conditions and judge whether the photographer is focusing on a main object based on the results of judgment. Such scene judgment may be performed in addition to the judgment under the above-mentioned shooting conditions (at least one of the depth of field, angle of view, and shooting scene mode) or may be performed alone. In the judgment processing of step S7, which of the depth of field, angle of view, shooting mode, and scene judgment or combination of two or more of the same to use may be freely changed by selection by the user.

Note that, the above described embodiments were described for the purpose of facilitating the understanding of the present invention and were not described for limiting the present invention. Therefore, the elements disclosed in the above embodiments include all design changes and equivalents falling under the technical scope of the present invention.

The invention claimed is:

1. An image processing apparatus comprising:
an input visual environment acquisition unit that acquires a shooting scene viewing condition at the time of shooting an image,
an output visual environment acquisition unit that acquires a shot image viewing condition,
a converting unit that converts the image using a predetermined color appearance model based on the shooting scene viewing condition acquired by the input visual environment acquisition unit and the shot image viewing condition acquired by the output visual environment acquisition unit, and
a correction unit that corrects a parameter of the color appearance model used by the converting unit by using at least one of a shooting condition that is used to determine a degree of focusing on a main object by a photographer and a scene type that indicates whether the photographer focused on the main object or not.

2. The image processing apparatus according to claim 1 wherein
the shooting condition includes at least one of depth of field, angle of view at the time of shooting the image and a shooting scene mode.

3. The image processing apparatus according to claim 1 wherein
the parameter corrected by the correction unit is an ambient brightness in the shooting scene viewing condition acquired by the input visual environment acquisition unit.

4. An image processing apparatus comprising:
an input visual environment acquisition unit that acquires a shooting scene viewing conditions at the time of shooting an image,
an output visual environment acquisition unit that acquires a shot image viewing condition,
a converting unit that converts the image using a predetermined color appearance model based on the shooting scene viewing condition acquired by the input visual environment acquisition unit and the shot image viewing condition acquired by the output visual environment acquisition unit, and
a selecting unit that selects a tone conversion characteristic used by the converting unit for tone conversion by using at least one of a shooting condition that is used to determine a degree of focusing on a main object by a photographer and a scene type that indicates whether the photographer focused on the main object or not, the shooting condition including at least one of depth of field, angle of view at the time of shooting the image and a shooting scene mode.

5. The image processing apparatus according to claim 4 further comprising a correction unit that corrects a parameter of the color appearance model used by the converting unit by using at least one of the shooting condition of the image and the scene type, wherein the selecting unit selects the tone conversion characteristic based on the result of correction of the parameter of the color appearance model, and wherein the parameter corrected by the correction unit is an ambient brightness in the surroundings based on the shooting scene viewing condition acquired by the input visual environment acquisition unit.

6. An image processing method comprising:

an input visual environment acquisition step that acquires a shooting scene viewing condition at the time of shooting an image, an output visual environment acquisition step that acquires a shot image viewing condition, a converting step that converts the image using a predetermined color appearance model based on the shooting scene viewing condition acquired by the input visual environment acquisition step and the shot image viewing condition acquired by the output visual environment acquisition step, and a correction step that corrects a parameter of the color appearance model used by the converting step by using at least one of a shooting condition that is used to determine a degree of focusing on a main object by a photographer and a scene type that indicates whether the photographer focused on the main object or not.

7. The image processing method according to claim 6 wherein the shooting condition includes at least one of depth of field, angle of view at the time of shooting the image and a shooting scene mode.

8. An image processing method comprising:

an input visual environment acquisition step that acquires a shooting scene viewing conditions at the time of shooting an image, an output visual environment acquisition step that acquires a shot image viewing condition, a converting step that converts the image using a predetermined color appearance model based on the shooting scene viewing condition acquired by the input visual environment acquisition step and the shot image viewing condition acquired by the output visual environment acquisition step, and a selecting step that selects a tone conversion characteristic used by the converting step for tone conversion by using at least one of a shooting condition that is used to determine a degree of focusing on a main object by a photographer and a scene type that indicates whether the photographer focused on the main object or not, the shooting condition including at least one of depth of field, angle of view at the time of shooting the image and a shooting scene mode.

9. An electronic camera comprising an imaging device and an image processing apparatus according to claim 1.

10. An electronic camera comprising an imaging device and an image processing apparatus according to claim 4.

11. A non-transitory computer-readable storage medium that stores a computer-executable program for an image processing apparatus, the program comprising instructions for:

acquiring a shooting scene viewing condition at the time of shooting an image, acquiring a shot image viewing condition, converting the image using a predetermined color appearance model based on the shooting scene viewing condition and the shot image viewing condition, and correcting a parameter of the color appearance model by using at least one of a shooting condition that is used to determine a degree of focusing on a main object by a photographer and a scene type that indicates whether the photographer focused on the main object or not.

12. A non-transitory computer-readable storage medium that stores a computer-executable program for an image processing apparatus, the program comprising instructions for:

acquiring a shooting scene viewing conditions at the time of shooting an image, acquiring a shot image viewing condition, converting the image using a predetermined color appearance model based on the shooting scene viewing condition and the shot image viewing condition, and selecting a tone conversion characteristic used in the step of converting the image for tone conversion by using at least one of a shooting condition that is used to determine a degree of focusing on a main object by a photographer and a scene type that indicates whether the photographer focused on the main object or not, the shooting condition including at least one of depth of field, angle of view at the time of shooting the image and a shooting scene mode.

* * * * *